United States Patent Office 3,301,487
Patented Jan. 31, 1967

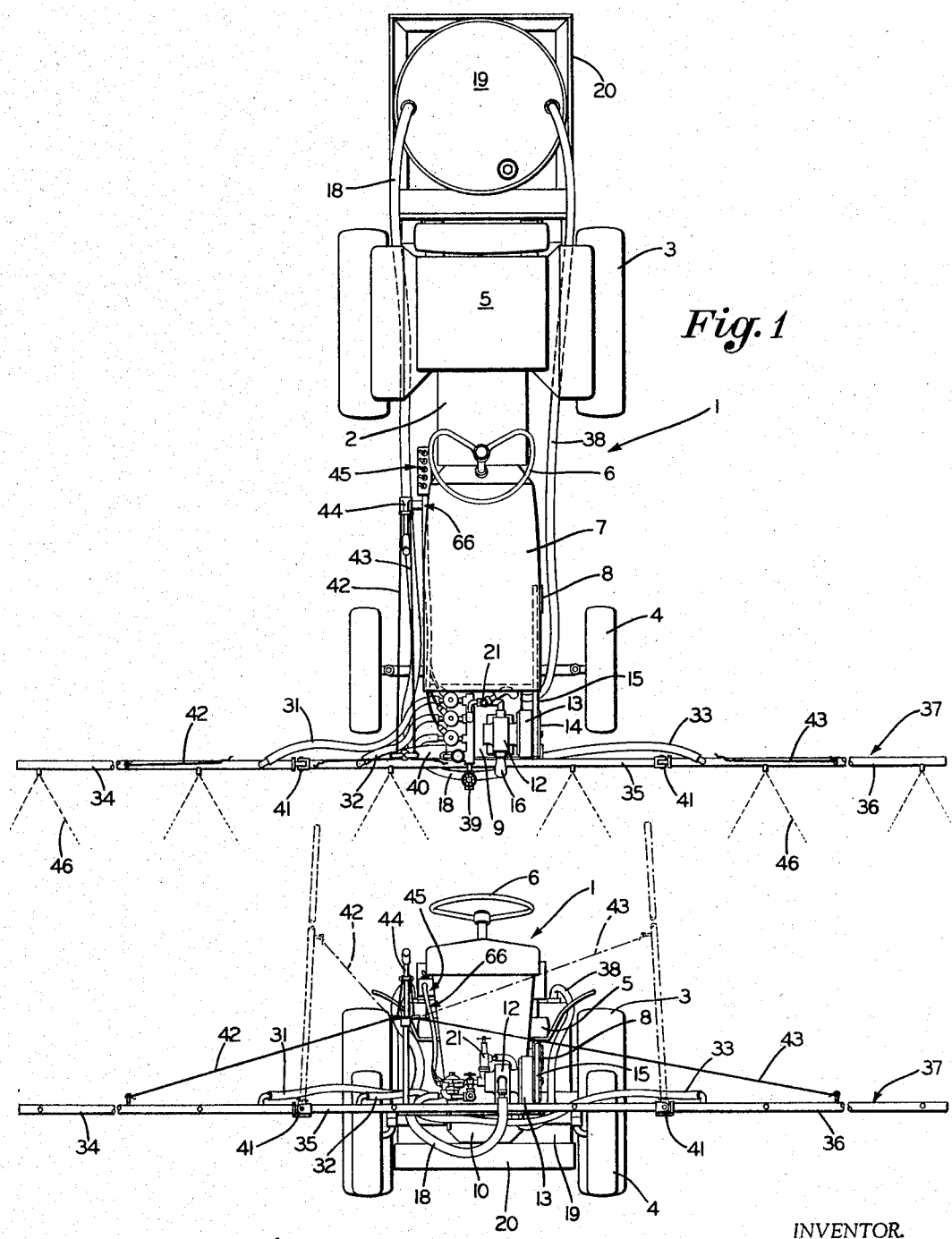

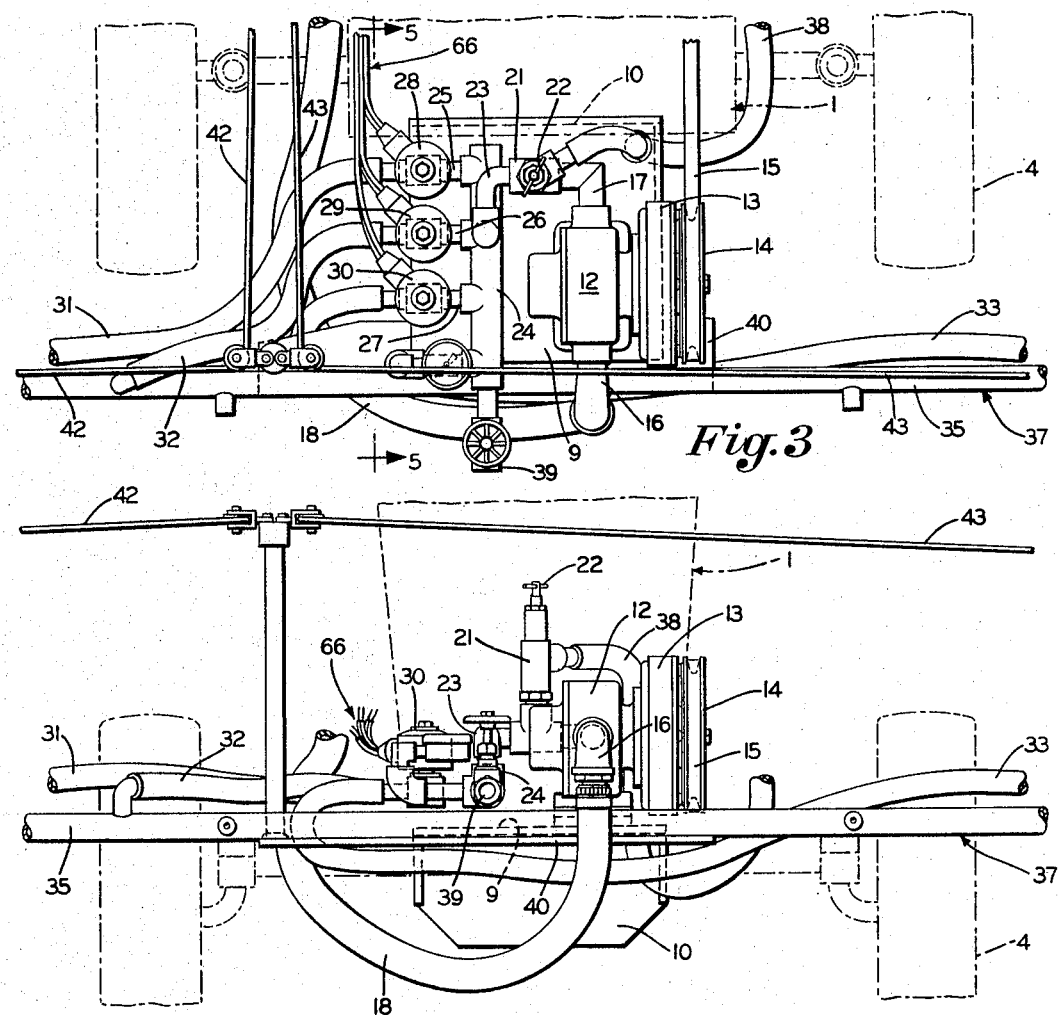
Fig. 3
Fig. 4
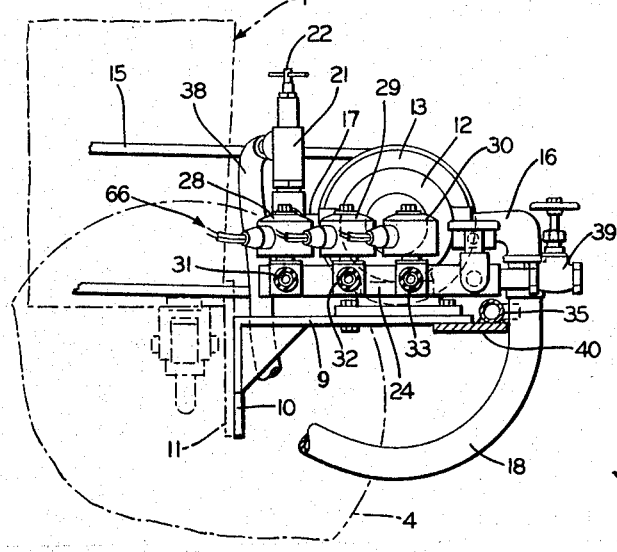
Fig. 5
INVENTOR.
Ramon J. Young
BY
Frease, Bishop, Johns & Schick
ATTORNEYS

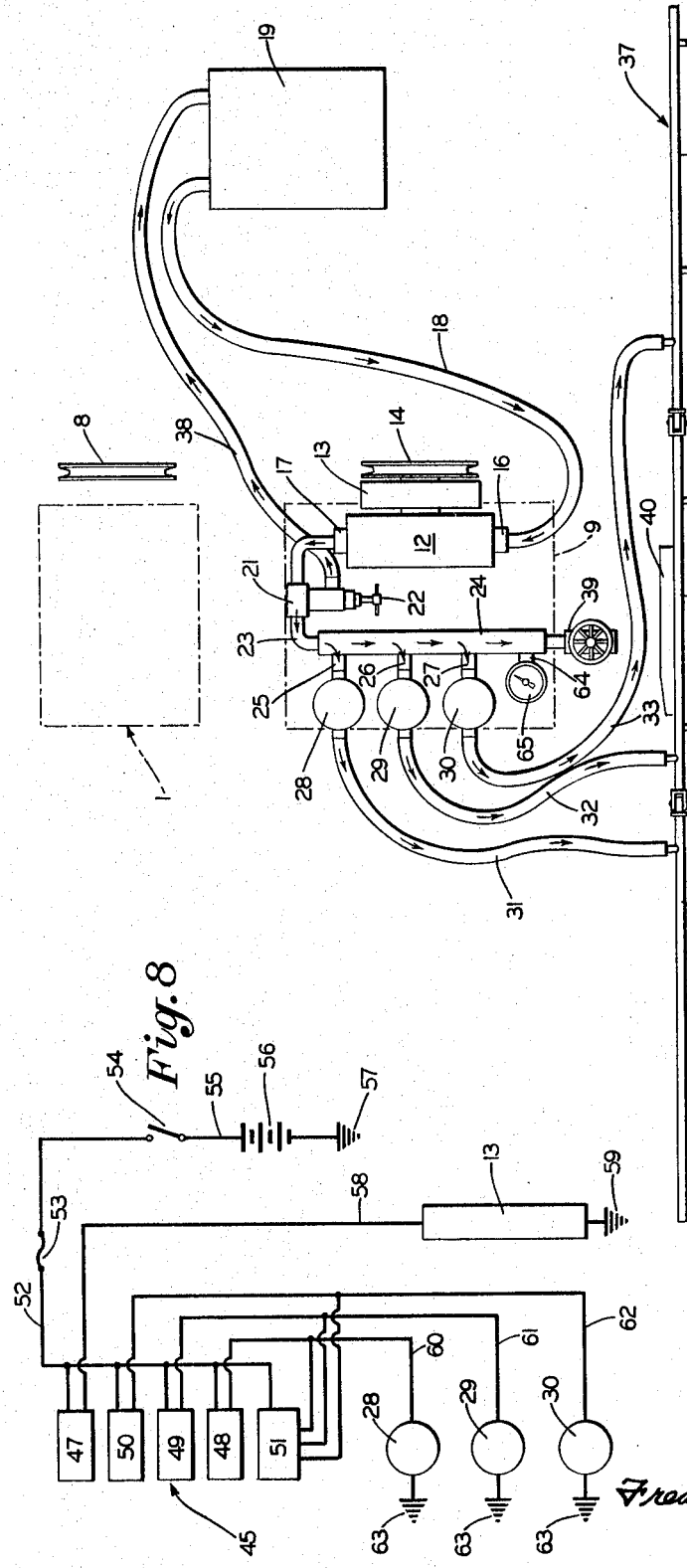
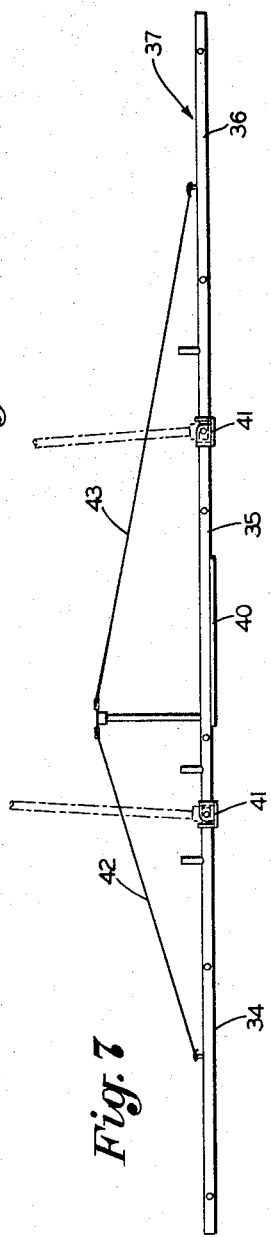

3,301,487
SPRAYER CONSTRUCTION FOR YARD TRACTORS EMPLOYING ELECTRO-MAGNETIC CLUTCH AND SOLENOID VALVES
Ramon J. Young, North Canton, Ohio, assignor of 35/100 part to Thelma Mae Young and 10/100 part to Lawrence Shirley Young, both of Hartville, Ohio
Filed Nov. 27, 1964, Ser. No. 414,212
3 Claims. (Cl. 239—168)

The invention relates to sprayer equipment for relatively small yard, lawn, or garden tractors; and more particularly to sprayer equipment which readily may be attachment-mounted on a small yard tractor adjacent a tractor power takeoff, and including a hand nozzle connection, and a sectional sprayer boom, any section of which may be operated and the entire sprayer equipment controlled by one individual driving the tractor from the driver's seat without getting off of the tractor to perform relatively small yard, lawn, garden, or tree spraying operations in residential or suburban areas.

Sprayer equipment of various types has been available and used for years for large spraying operations on farms, in fields, in orchards, etc. Such prior spraying equipment, which may be termed farm, commercial or industrial spraying equipment, is relatively massive. It normally is mounted on a trailer pulled by a large farm tractor, or on the bed of a truck adapted for moving through the areas to be sprayed, for instance, in fields, woods, orchards, or along roadsides, for mosquito control, shade tree and orchard insect and disease control, fertilizing, sanitation, etc.

It is not feasible, practical, or economical to use such farm equipment to spray residential or suburban yards or lawns, or to carry out spraying operations on trees or shrubbery in such residential or suburban areas.

Heretofore, the only sprayer equipment available for use in residential spraying operations with small yard, lawn, or garden tractors operated by one individual who rides the tractor has been essentially miniature copies of large commercial spraying devices. It either has included sprayers, etc. mounted on a dolly or trailer and pulled by the yard tractor; or has been equipment mounted on a yard tractor inaccessible for convenient operation or use except by two persons, or except by one individual tractor operator who must get off of and onto the tractor to control or change operation of the sprayer equipment.

There has been an existing need for relatively simple sprayer equipment for a small yard tractor which can be used for small residential or suburban spraying operations by one tractor operator without getting off of the tractor; which eliminates manually operated valves; which involves equipment readily controlled by the tractor operator when seated at the driver's seat to spray selectively from separate or multiple boom stations; which comprises equipment components requiring very little, if any, maintenance or repair to maintain proper operation of the spraying equipment; which may be quickly mounted as accessory equipment on a yard tractor; and which involves a minimum amount of spray conduit or hose and connections therefor, thus reducing to a minimum potential leakage problems.

Accordingly, it is a general object of the present invention to provide new sprayer equipment for small yard tractors having versatility of use and which may be operated and controlled by one tractor operator seated at the tractor driver's seat without getting off of the tractor.

Also, it is an object of the present invention to provide new sprayer equipment for small yard tractors including a packaged unit of major sprayer and control components adapted to be mounted adjacent a desired tractor power takeoff, connected by conduits with a spray head and a spray solution tank mounted at desired locations on the tractor, and also connected with control means mounted at the tractor driver's seat.

Also, it is an object of the present invention to provide new sprayer equipment for small yard tractors having pump means power operated from the tractor, and having the pump and selective spray heads electrically controlled by switches all located at the driver's seat so that spraying operations may be controlled instantly and carried out by one individual driving the tractor without getting off of the tractor, or stopping tractor movement.

Finally, it is an object of the present invention to provide new sprayer equipment for small yard tractors eliminating difficulties heretofore encountered in the art, eliminating expensive trailer and dolly sprayer mounting equipment, eliminating the need for two persons to carry out small spraying operations at residential or suburban areas, achieving the stated objects in a simple, effective and inexpensive manner, and solving problems and satisfying needs existing in the art.

These and other objects and advantages, apparent to those skilled in the art from the following description and claims, may be obtained, the stated results achieved, and the described difficulties overcome, by the apparatus, combinations, parts, elements, subcombinations, arrangements and constructions which comprise the present invention, the nature of which is set forth in the following general statement, a preferred embodiment of which—illustrative of the best mode in which applicant has contemplated applying the principles—is set forth in the following description and shown in the drawings, and which are particularly and distinctly pointed out and set forth in the appended claims forming part hereof.

The nature of the improved sprayer equipment for small yard tractors having a power takeoff, a battery, a frame and a driver's station, seat, or location, may be stated in general terms as including support bracket means adapted to be mounted on the frame of a tractor adjacent a tractor power takeoff; pump means having an inlet and an outlet mounted on the support bracket; and electromagnetically actuated clutch for the pump means including a pump drive pulley adapted to be driven from the tractor power takeoff; a spray solution tank adapted to be mounted on the tractor frame; conduit means between the tank and pump inlet; pressure regulator means and a pressure manifold mounted on the support bracket; pressure conduit means connecting the pump outlet, pressure regulator means, pressure manifold and tank; sectional spray boom means having a plurality of separate preferably relatively movable spray heads mounted on the support bracket; conduit means separately connecting each head with the pressure manifold and including a solenoid controlled valve mounted on the support bracket for each spray head; switch means connected with the clutch and solenoid controlled valves adapted to be mounted at the driver's station and to be connected with the tractor battery for controlling operation of the pump means and selectively of the solenoid controlled valves from the driver's station without leaving such station; and the support bracket and components mounted thereon comprising a unitary package adapted readily to be attached as a sprayer accessory to a small yard tractor.

By way of example, an embodiment of the improved sprayer construction for yard tractors is shown in the accompanying drawings forming part hereof in which:

FIGURE 1 is a somewhat diagrammatic plan view of a yard tractor equipped with the improved sprayer construction;

FIG. 2 is a front elevation of the equipment shown in FIG. 1;

FIG. 3 is an enlarged fragmentary plan view of the improved sprayer equipment;

FIG. 4 is a front view of the equipment shown in FIG. 3;

FIG. 5 is a side view looking in the direction of the arrows 5—5, FIG. 3, of the equipment shown in FIG. 3;

FIG. 6 is a diagrammatic view showing the piping, hose or conduit connections between the various components of the improved sprayer equipment;

FIG. 7 is a front view of certain of the parts shown in FIG. 6; and

FIG. 8 is a wiring diagram of the control devices for the new sprayer equipment.

Similar numerals refer to similar parts throughout the various figures of the drawings.

A tractor generally indicated at 1 to be equipped with the sprayer is of the yard, lawn, or garden type, is quite small, and may include a frame 2, wheels 3 and 4, a driver's seat 5, a steering wheel 6 and a motor beneath the hood 7. The motor typically is provided with a power takeoff pulley indicated at 8 in FIGS. 1 and 6, the tractor 1 being generally indicated in dot-dash lines in FIGS. 3, 4, 5, and 6. The tractor forms no part of the invention. It is understood that various kinds and types of yard tractors may be equipped with the improved sprayer equipment as an accessory.

In accordance with the invention, a small, preferably rectangular L-shaped sprayer unit mounting bracket having a top plate 9 and an angular mounting plate 10 is mounted on frame member 11 of tractor 1 in any desired manner as by bolts, not shown. A pump 12 of any desired construction is mounted on plate 9 having a clutch 13 driven by pulley 14 which in turn is rotated by belt 15 which is adapted to engage tractor motor power takeoff pulley 8. Clutch 13 in accordance with the invention is electro-magnetically controlled so that in one condition of energizing or de-energizing of its electro-magnetic control means the clutch is engaged and in the other condition the clutch is disengaged. Pump 12 has an inlet 16 and an outlet 17. Inlet 16 preferably is connected by hose or conduit 18 with a tank 19 containing spray solution and mounted on platform 20 attached to the rear of tractor 1.

Spray solution pumped under pressure through pump outlet 17 passes to a pressure regulator 21 which may be adjusted at 22. Solution then is pumped at the desired pressure from regulator 21 through conduit 23 to a manifold 24 carried on mounting bracket plate 9 having a series of outlets 25, 26, and 27 connected, respectively, through valves 28, 29, and 30, and hose 31, 32, and 33 with sections 34, 35, and 36 (FIG. 6) of a spray boom generally indicated at 37. Excess solution at the pressure regulator 21 is pumped through conduit 38 back to tank 19. A valve 39 may be connected with manifold 24 to which a hose, not shown, may be connected leading to a hand spray wand if it is desired to spray from a hand spray head.

The spray boom 37 is preferably composed of sections 34, 35, and 36 in a known manner. Section 35 is mounted at 40 on support bracket plate 9 (FIG. 5) so that substantially all of the equipment is carried as a packaged unit by the support bracket and can be quickly mounted on any tractor as an accessory attachment at a location adjacent the power takeoff. The other spray boom sections 34 and 36 preferably are hinge-mounted at 41 at the ends of section 35. There is no fluid communication between the sections 34, 35, and 36, each being supplied separately with spray solution under pressure so that sprays selectively may be directed on areas being sprayed from nozzles as indicated at 46 in FIG. 1.

When either or both of boom sections 34 and 36 are not in use, to avoid striking a bush or other object in a yard, or during non-spraying transportation or storage, these sections 34 and 36 may be pivoted to the dot-dash positions shown in FIGS. 2 and 7 by manipulating control lines 42 and 43 separately or in unison at the control position 44 within reach of a tractor operator seated on seat 5 (FIG. 1).

In accordance with the invention, valves 28, 29, and 30 are solenoid-operated or are otherwise electrically-controlled valves. The operation of solenoid valves 28, 29, and 30 and of clutch 13 is controlled at switch box generally indicated at 45 in FIG. 1 adjacent the driver's seat.

Referring to FIG. 8, switch box 45 may include five switches 47, 48, 49, 50, and 51. One side of each of switches 47 through 51 is connected through line 52 preferably fused at 53 with a typical key controlled switch 54 and then by line 55 with tractor battery 56, the other side of which is connected to ground 57.

Switch 47 also is connected by line 58 with the electromagnetic control of clutch 13 which also is grounded at 59. Switches 48, 49, and 50 are connected, respectively, by lines 60, 61, and 62 with the solenoids of solenoid-operated valves 28, 29, and 30, respectively, the other side of each of which is grounded as indicated at 63 in FIG. 8.

Multiple control switch 51 is connected with line 52 and also by separate lines with each of lines 60, 61, and 62 so that switch 51 controls all of the valves 28, 29, and 30 simultaneously when desired. In this manner, depending on which of the four switches 48 through 51 is actuated, any one or more or all of spray sections 34, 35, and 36 may be supplied with spray solution under pressure by the simple operation selectively of the desired switch by the tractor driver seated at the driver's seat. Pumping, of course, is controlled by operation of switch 47 when the tractor motor is running to engage or disengage clutch 13 and thereby to drive or stop pump 12.

When desired, a connection 64 may extend from manifold 24 to a pressure gauge 65 for registering the system pressure established by manipulation of regulator 22.

Since excess solution is pumped from pressure regulator 21 under pressure through conduit 28 back to tank 19, the solution pumped back to the tank, being under high pressure, agitates the solution in the tank to maintain mixing and suspension in the tank of solid material in powder form being sprayed in solution by the equipment.

The electrical cable connections of the various lines shown in the wiring diagram between the solenoid valves 28, 29, and 30 and clutch and the switch box 45 at the driver's seat is indicated generally at 66 in FIGS. 1 to 5.

The basic components of the sprayer equipment of the invention all are mounted on support bracket plate 9 including the pump 12 and its clutch and pulley, the pressure regulator 21, the solenoid valves 28, 29, and 30 and the spray boom 37 as well as hose conduits 31, 32, and 33, and the cable 66 connected with switch box 45. Thus, in installing the equipment on a yard tractor, platform 20 may be mounted on the tractor to hold the barrel, drum, or tank 19 containing solution to be sprayed. The spray equipment as a unit on plate 9 may be mounted on the tractor adjacent a power takeoff and connected by a belt drive 15. Switch box 45 may be mounted at the tractor driver's seat. Control position 44 for the manipulating control lines for the spray boom also may be mounted adjacent the driver's seat. Hose lines 38 and 18 may then be connected from the packaged sprayer unit to tank 19 and the sprayer is ready for operation.

Excepting for the hinged joints for the spray boom and the movability of the parts in the solenoid valves, there are no moving parts in the equipment excepting the pump and its clutch. Thus, very little maintenance or repairs are involved in maintaining the equipment in proper working order.

One important and fundamental aspect of the invention is the electrical control of the pump and valves. This permits simplicity of construction, mounting and operation of the sprayer equipment by the tractor driver from the driver's seat. For example, manually operated valves cannot be substituted for the solenoid valves to achieve the benefits of the invention, because where such manually controlled valves are located adjacent the pump which of necessity must be located adjacent the power takeoff, it is necessary for the driver to leave the driver's seat to adjust one or more or all of the valves.

On the other and, if one attempts to overcome this difficulty by locating the manually controlled valves at the driver's seat, a maze of hose, piping, piping connections, etc. is required between the valves, pump, and spray boom. The mounting and supporting of such maze of piping on a small yard tractor is completely impractical. Furthermore, the maintenance of such hose and hose connections with manual valves and other components of such modified system against leakage becomes a problem of great magnitude.

Accordingly, the improved construction provides sprayer equipment which may be attached as an accessory to small yard tractors having versatility in use, which may be operated and controlled by one tractor operator seated at the tractor driver's seat without getting off of the tractor, and which eliminates difficulties heretofore encountered in the art, achieves the stated objects, accomplishes the many new functions described and solves problems which have existed in the art.

In the foregoing description, certain terms have been used for brevity, clearness and understanding, but no unnecessary limitations are to be implied therefrom beyond the requirements of the prior art, because such terms are used for descriptive purposes and are intended to be broadly construed.

Moreover, the description and illustration of the invention is by way of example and the scope of the invention is not limited to the exact structure shown, because the sizes and shapes of the various parts and components may be varied to provide other structural embodiments, without departing from the fundamental principles of the invention.

Having now described the features, discoveries and principles of the invention, the construction, operation and use of a preferred form thereof, and the advantageous, new and useful results obtained thereby; the new and useful discoveries, principles, apparatus, combinations, parts, elements, subcombinations, structures, cooperative relationships and arrangements, and constructions, and mechanical equivalents obvious to those skilled in the art are set forth in the appended claims.

I claim:

1. Sprayer attachment construction for small yard tractors of the type having a power takeoff, a battery, a frame, and a driver's station; including support bracket means; pump means having an inlet and an outlet; electro-magnetic clutch means mounted on the pump means and including pump drive pulley means adapted to be connected to and driven from a tractor power takeoff; a source of spray solution connected with the pump inlet; a pressure manifold connected with a pump outlet; spray boom means including a plurality of separate spray heads; conduit means separately connecting each spray head with the pressure manifold and including a solenoid controlled valve for each spray head; switch means connected with the clutch means and solenoid controlled valves adapted to be connected with the tractor battery for controlling operation of the pump means and selectively of the solenoid controlled valves; and the pump means, pressure manifold, spray boom means, conduit means and solenoid valves all being mounted on the support bracket means as a unitary sprayer attachment package; whereby when the support bracket means is mounted on the frame of a tractor adjacent a tractor power takeoff, and when the switch means is mounted on such tractor at the driver's station, the sprayer attachment may be controlled and operated by one person at the driver's station without leaving such station and during movement of the tractor.

2. Sprayer attachment construction for small yard tractors of the type having a power takeoff, a battery, a frame, and a driver's station; including support bracket means; pump means having an inlet and an outlet; electro-magnetic clutch means mounted on the pump means and including pump drive pulley means adapted to be connected to and driven from a tractor power takeoff; a spray solution tank adapted to be mounted on the tractor frame; hose means connecting the tank with the pump inlet; a pressure manifold; pump pressure connection means between the pump outlet and pressure manifold including pressure regulator means; spray boom means including a plurality of separate spray heads; conduit means separately connecting each spray head with the pressure manifold and including a solenoid controlled valve for each spray head; switch means connected with the clutch means and solenoid controlled valves adapted to be connected with the tractor battery for controlling operation of the pump means and selectively of the solenoid controlled valves; and the pump means, pressure regulator means, pressure manifold, spray boom means, conduit means and solenoid valves all being mounted on the support bracket means as a unitary sprayer attachment package; whereby when the support bracket means is mounted on the frame of a tractor adjacent a tractor power takeoff, and when the switch means is mounted on such tractor at the driver's station, the sprayer attachment may be controlled and operated by one person at the driver's station without leaving such station and during movement of the tractor.

3. In mobile, power-operated sprayer equipment of a type in which a plurality of sprayer heads may be controlled and operated by one person at the driver's station of the mobile equipment during equipment movement and without leaving such station; the combination of power driven pump means having an inlet and an outlet; a source of spray solution connected with the pump inlet; a pressure manifold connected with the pump outlet; a plurality of separate spray heads; conduit means separately connecting each spray head with the pressure manifold and including a solenoid control valve for each spray head; a battery; switch means connected with the solenoid control valves and battery for controlling operation selectively of the solenoid control valves; other switch means connected with the battery and the power driven pump means for controlling operation of the pump; both switch means being mounted at the mobile equipment driver's station; and the power driven pump means, source of spray solution, pressure manifold, separate spray heads, and solenoid control valves being mounted on the mobile equipment remote from the driver's station.

References Cited by the Examiner

UNITED STATES PATENTS

| 762,620 | 6/1904 | Eastwood | 103—23 |
|---|---|---|---|
| 1,485,222 | 2/1924 | Ginty | 239—158 X |
| 2,655,405 | 10/1953 | Lattner | 239—170 X |
| 2,682,132 | 6/1954 | Marihart | 239—159 X |
| 2,988,285 | 6/1961 | Shaffer | 239—150 X |
| 3,158,324 | 11/1964 | Oehler et al. | 239—159 |
| 3,163,880 | 1/1965 | Johnson | 239—165 X |
| 3,236,456 | 2/1966 | Ackley et al. | 239—170 X |

M. HENSON WOOD, JR., *Primary Examiner.*

V. C. WILKS, *Assistant Examiner.*